Aug. 4, 1931.    C. S. BRAGG ET AL    1,817,800
BRAKE MECHANISM FOR AUTOMOTIVE VEHICLES
Filed Jan. 20, 1927.

INVENTORS
Caleb S. Bragg
Victor W. Kliesrath
BY
Louis Trevor Whitaker
ATTORNEY

Patented Aug. 4, 1931

1,817,800

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed January 20, 1927. Serial No. 162,233.

Our invention consists in the novel features hereinafter described, reference being had to the accompanying drawings which illustrate one embodiment of the invention selected by us for purposes of illustration, and the said invention is fully disclosed in the following description and claims.

Our invention is an improvement in power actuated brake mechanism for automotive vehicles of the kind in which the brake mechanism is operated normally by a power actuator comprising a cylinder, a piston connected with the brake mechanism, and controlling valve mechanism, means being provided by which the actuator cylinder may be connected under the control of said valve mechanism on one side of the piston with a source of suction, as by a suction pipe connected with the suction passage of the internal combustion engine which propels the vehicle, and on the other side of the piston with the atmosphere, to effect a power stroke of the piston to apply the brakes, the said controlling valve mechanism being connected with an operator operated part which is also connected with the brake mechanism, by means permitting lost motion, preferably by so connecting it with the piston of the actuator, whereby the operator may add his physical force to that of the actuator, and may also operate the brake mechanism by physical force alone in case of failure of power.

Our present invention consists in providing means for disconnecting the suction pipe from the actuator and venting the actuator cylinder at any time under the control of the operator so that the power actuator is thrown out of operation, whereby the brake mechanism may be operated entirely by the operator operated part and by the physical force of the operator so long as such condition exists. In carrying our invention into effect, we preferably accomplish this result by means of a valve mechanism, which is conveniently located in the suction pipe extending from the suction passage of the engine to the actuator, and having an operating part within reach of the driver of the vehicle, said valve being preferably provided with means for insuring its being placed in one of two positions, in one of which the power actuator is connected with the suction passage, and in the other of which the power actuator is disconnected from the suction passage and connected with the atmosphere in such manner as to vent the cylinder of the actuator and permit free movement of the piston therein.

We have found from actual experience that the co-efficient of friction between the vehicle tires and the road surface varies greatly, due principally to the presence of water on the pavement, or in some instances a film of ice. If the brakes are applied while passing over such pavement, as forcibly as would be necessary on ordinary dry roads, there will be a tendency to lock the wheels with the result that the vehicle will skid and a serious accident may result.

The power actuated brake mechanism is ordinarily designed in the correct proportions, so that a normal stop may be made by the power actuator on dry pavements without the possibility of locking the wheels. Additional power may be added by the operator through the operator operated part to such an extent as to lock the wheels even on dry roadways, and it can readily be understood, therefore, that the normal operation of the brake mechanism by means of the power actuator may lock the wheels and produce skidding on slippery roads, especially if the tires are worn or smooth. By our invention the driver or operator may, whenever he encounters a slippery road condition, disconnect the power actuator from the suction passage and vent the actuator cylinder to the atmosphere and apply the brakes entirely by his physical strength, which will be more than sufficient under such circumstances to apply the necessary braking pressure, which may be safely applied on account of the reduced co-efficient of friction between the wheels and the roadway, permitting the operator to more effectively control the vehicle under such adverse conditions, and to more readily avoid locking the wheel by a too forcible application of the brakes. As soon as the vehicle has passed on to a portion of the roadway which is not slippery, the valve can be restored to its normal position to permit the normal operation of the brake mechanism by means of the power actuator and the operator operated part.

In the accompanying drawings.

Figure 1:
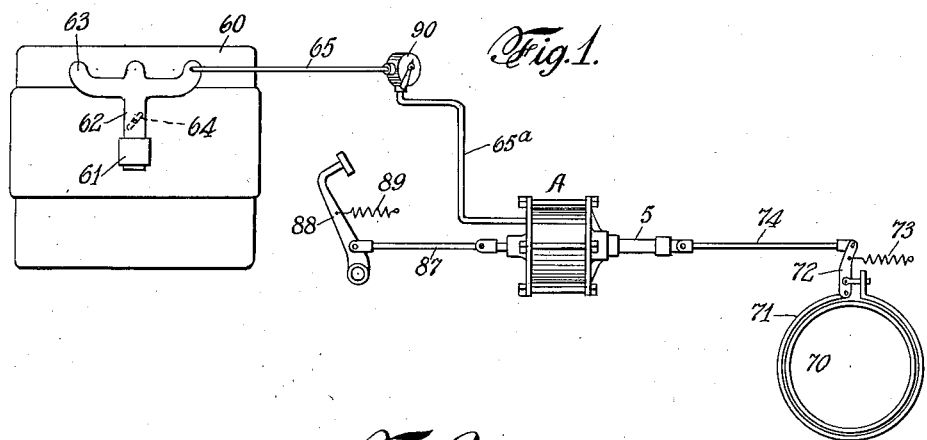
Fig. 1 represents a diagrammatic view of an installation in an automotive vehicle of brake mechanism embodying our present invention.
Figure 2:
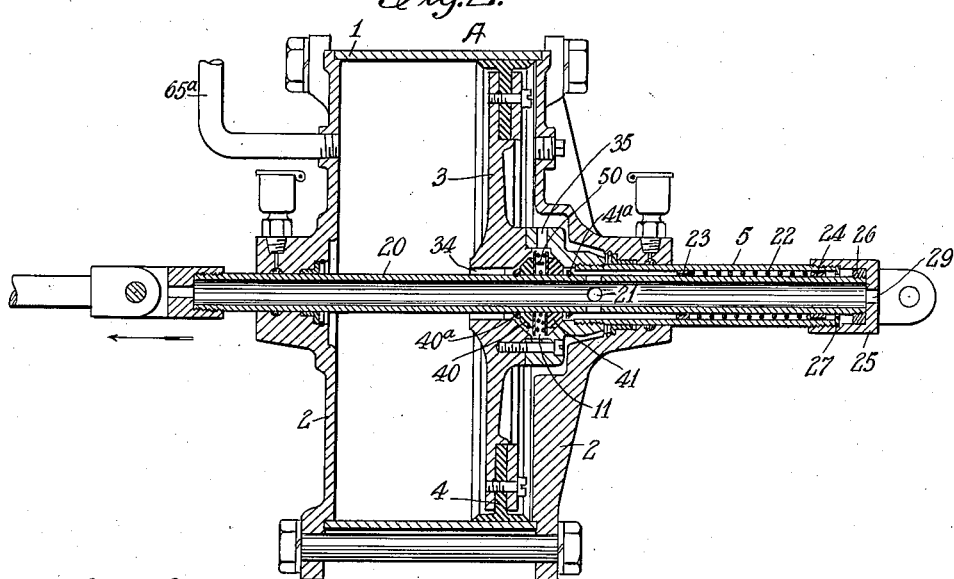
Fig. 2 is an enlarged section view of the power actuator shown in Fig. 1.
Figure 3:
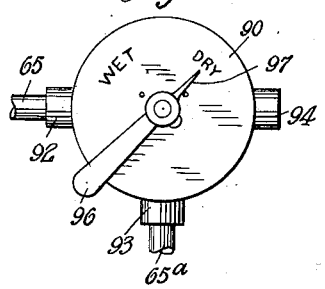
Fig. 3 is a front view of an auxiliary valve mechanism which we may conveniently employ in carrying out our present invention.

As indicated in Fig. 1, 60 represents an internal combustion engine for propelling the automotive vehicle provided with the usual carburetor, 61, suction passage, 62, manifold, 63, which forms a part of the suction passage, and throttle valve, 64. The vehicle may be provided with any suitable brake mechanism for two or more wheels thereof, the brake mechanism being diagrammatically represented in Fig. 1 by a single brake mechanism, in this instance comprising a drum, 70, brake band, 71, brake lever, 72, and retracting spring, 73, although any other form of brake mechanism may be employed. A, represents a power actuator as a whole, which in this instance is of the type shown in our former Patent No. 1,583,117, dated May 4, 1926, although our invention is not limited to this particular type of actuator. While the actuator itself does not form part of our present invention, it will be briefly described in order that our invention may be more clearly and readily understood. In this instance the power actuator comprises a cylinder, 1, having a piston, 3, provided with a hollow piston rod, 5, which is connected as by a link, 74, with the brake mechanism of the vehicle. The cylinder, 1, as shown, is closed at both ends, and the forward end of the cylinder is connected by a suction pipe indicated at 65, with the suction passage of the engine between the throttle valve and the engine cylinders. As shown, it is connected to the intake manifold, 63. The power actuator is provided with controlling valve mechanism, which is preferably located in the hub of the piston in a valve chamber indicated at 11, communicating with the forward portion of the cylinder by passage, 34, and with the cylinder in rear of the piston by passage, 35. The valve mechanism itself comprises in this instance a suction valve, 40, and air inlet valve, 41, the suction valve controlling the passage, 34, and air inlet valve controlling the admission of atmospheric air through an air inlet, 29, which communicates with the valve chamber, 11, through the hollow piston rod and through a hollow valve actuating sleeve, 20, provided with suitable apertures, 21. The valves are normally pressed toward their seats by an interposed spring or cushion indicated at 50, and said valves are preferably formed of molded rubber or other suitable elastic material, and provided with central apertures which engage the actuating sleeve, 20, with an air-tight or sealing fit. The sleeve, 20, is provided with collars, 40ª and 41ª, on opposite sides of the valves, so that a longitudinal movement of the sleeve in either direction will open one only of the valves. We prefer to normally hold the suction valve open when the piston, 3, is in retracted position, as shown in Fig. 2, in order that the cylinder on both sides of the piston may be connected with the suction pipe, 65, and the piston may be normally maintained submerged in vacuum, as this enables us to apply the brakes by simply admitting air in rear of the piston, 3, without admitting appreciable quantities of air to the intake manifold, and when the air inlet valve, 41, is closed, and the suction valve, 40, open, pressures are equalized and both ends of the cylinder connected with the suction pipe permitting the release of the brakes and allowing them to be returned to normal position by their retracting means. In this instance the suction valve, 40, is normally held open by a retracting spring, 22, surrounding the sleeve, 20, between the collar, 23, on the interior of the piston, 5, and the collar, 24, on the sleeve, which spring forces the sleeve in a direction opposite that indicated by the arrow in Fig. 2, until it is arrested by a suitable stop after the suction valve, 40, has been slightly opened. In this instance the stop is formed by the engagement of the end of the sleeve with the end of a recess in a cap, 25, secured to the piston rod. The sleeve, 20, extends through the forward head of the actuator and is connected by a link, 87, to a foot lever, 88, or other operator operated part which is provided with the usual retracting spring, 89. We also provide means for connecting the operator operated part with the piston, which in this instance consists of a collar, 26, on the sleeve, 20, within the cap, 25, which is adapted to engage a collar, 27, secured to the hollow piston rod when the sleeve, 20, has been moved in the direction of the arrow in Fig. 2 far enough to permit the suction valve, 40, to close, and to effect the opening of the air inlet valve, 41, to admit air in rear of the piston. This arrangement provides lost motion between the operator operated part and the piston of the actuator sufficient to insure the operation of the valve mechanism, and by taking up this lost motion the operator may add his physical force to that of the piston when the power actuator is being operated to apply the brakes, and he may also operate the piston and the brake mechanism connected therewith by physical force alone in case of failure of power.

Figure 4:
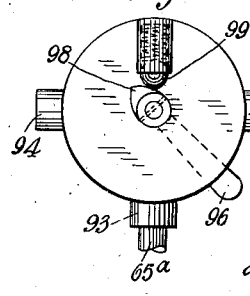
Fig. 4 represents a rear view of the same.
Figure 5:
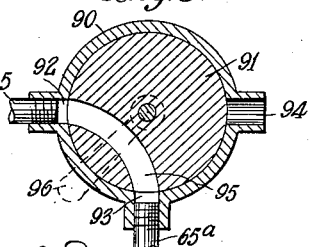
Fig. 5 represents a sectional view of the auxiliary valve mechanism.

As indicated in Fig. 1, the suction pipe, 65, is provided with an auxiliary valve, the casing of which is indicated at 90, and is provided in this instance with a rotary valve, 91. The valve casing is provided with ports, 92 and 93, to which the portions 65 and 65ᵃ, of the suction pipe, are connected, and with an air inlet port, 94, communicating with the atmosphere. The valve, 91, is provided with a passage indicated at 95, adapted in one position of the valve to connect the ports, 92 and 93, and form a part of the suction pipe, 65, and in the other position of the valve to connect the portion of the pipe between the valve and the actuator, indicated at 65ᵃ, with the atmosphere or air inlet port, 94. This valve mechanism is preferably mounted on the dash, or at any other desired point within convenient reach of the operator, and the valve is provided with an operating arm or handle, 96, and a pointer, 97. The valve casing may also be marked appropriately to indicate, in connection with the pointer, the two positions of the valve. For example, the normal position of the valve may with the pointer indicate the word "Dry" on the valve casing, that is to say, when the valve is in the position indicated in Fig. 5, and the actuator is in the operative position, the other position of the valve being indicated by the word "Wet," to which the pointer points when the valve is moved to connect the actuator with the atmosphere to vent the cylinder and disconnect it from the suction pipe. These words would serve to indicate the proper position of the valve lever, 96, for wet and dry road conditions. The valve, 91, is preferably provided with means for insuring that it shall be in one or other of said positions, and not in a neutral position. This may be accomplished by any conventional means in ordinary use, one of which we have indicated in Fig. 4, in which the shaft of the valve, 91, is provided with a heart-shaped cam, 98, co-operating with a spring pressed yielding plunger or ball, 99, which when engaging either side of said cam beyond the apex thereof will throw the cam to its extreme position in either direction, which thereby insures that the valve shall be completely moved from one position to the other.

In the operation of the apparatus embodying our invention, heretofore described, when the driver sees a piece of slippery road ahead of him, he turns the handle, 96, to the position indicating "Wet" for example, thereby shifting the valve, 91, from its normal position to the position in which the passage, 95, connects the actuator with the atmospheric port, 94. The suction valve, 40, being open, as shown in Fig. 2, air will be admitted to the cylinder on both sides of the piston, equalizing pressures therein, and venting the forward side of the cylinder to the atmosphere. The operator may now apply the brakes by his own physical power by operating the foot lever, 88. The first movement of the foot lever will permit the suction valve, 40, to close, and open the valve, 41, thus connecting the cylinder, 1, in rear of the piston with the atmosphere, and as soon as the collar, 26, engages the collar, 27, the lost motion being taken up, the further movement of the foot lever will move the piston forward and apply the brake mechanism connected therewith to the extent desired by the operator. The piston, 3, of the actuator will offer no resistance to the application of the brakes beyond the friction of its gaskets with the cylinder, being exposed to atmospheric pressure on both sides. On the release of the foot lever, the spring, 22, will retract the sleeve, 20, with respect to the piston, closing the air inlet valve, 41, and again opening the suction valve, 40, which places the cylinder on both sides of the piston in communication with the atmosphere through the portion, 65ᵃ, of the suction pipe, and the air inlet port, 94, permitting an instant release of the brakes, and allowing them to be returned to normal position by their retracting means. As soon as the slippery pavement has been passed over, the operator may turn the handle of the auxiliary valve to the "Dry" position, which will reestablish the connection between the suction passage of the engine and the cylinder, 1, on both sides of the piston, 3, (the suction valve, 40, being held open), thereby exhausting the air from the cylinder, and again submerging the piston 3, in vacuum ready for the normal operation of the brake mechanism by the power actuator and the operator operated part, 88.

Our invention also produces another desirable and useful result. By turning the auxiliary valve, 91, to "Wet" position, when starting the engine while cold, the engine may be started without withdrawing any air from the actuator through the suction pipe, 65, 65ᵃ, and this is frequently desirable. As soon as the engine has become warm and is operating efficiently, the valve, 91, can be switched to the "Dry" position, reconnecting the portions of the suction pipe, 65 and 65ᵃ, and quickly withdrawing the air from the actuator cylinder on both sides of the piston therein.

In the foregoing description and in the following claims we have used the term "to vent the cylinder" as meaning establishing communication between the cylinder and the atmosphere, so as to permit the piston to be moved without producing any change of pressure within the cylinder by its movement.

While we have shown and described our invention in a brake system in which the suction passage of an internal combustion engine is relied upon as the source of suction, it is not limited to use in connection with such suction passage, but may also be employed in brake systems where other sources of suction are available.

What we claim and desire to secure by Letters Patent is:—

1. In an automotive vehicle, the combination with brake mechanism for the vehicle, a suction actuated power actuator therefor comprising a cylinder, a piston connected with said brake mechanism, and controlling valve mechanism, a suction pipe for connecting the power actuator with a source of suction, and an operator operated part connected with said valve mechanism and operatively connected with said brake mechanism by means providing lost motion, of auxiliary valve mechanism located in the suction pipe, and comprising a valve casing provided with a port connected with the source of suction, a port connected with the actuator, and an air inlet port communicating with the atmosphere, a movable valve in said valve casing constructed to connect the port communicating with the actuator, with the suction port, and to close the air inlet port in one position, and to close said suction port, and connect the port communicating with the actuator with the air inlet port in another position of the valve, to disconnect the actuator from the source of suction and vent the cylinder of the actuator, to permit the brake mechanism to be applied by the physical force of the operator when desired, and means for preventing the valve from remaining in an intermediate position.

2. In an automotive vehicle, the combination with brake mechanism for the vehicle, a suction actuated power actuator therefor comprising a cylinder, a piston connected with said brake mechanism, and controlling valve mechanism, a suction pipe for connecting the power actuator with a source of suction, and an operator operated part connected with said valve mechanism and operatively connected with said brake mechanism by means providing lost motion, of means operated independently of the controlling valve mechanism and coacting with said controlling valve mechanism for maintaining equalization of pressures on the piston when the operator operated part is operated, whereby the brake mechanism may be applied by the physical force of the operator only, through the operator operated part.

3. In an automotive vehicle, the combination with brake mechanism for the vehicle, a suction actuated power actuator therefor, including a cylinder and a piston operating therein and operatively connected with the brake mechanism, controlling valve mechanism for said actuator, a suction pipe connecting the power actuator with the source of suction, means for holding said valve mechanism in position to submerge the piston in vacuum when in retracted position, and an operator operated part connected with the valve mechanism and operatively connected with the brake mechanism by means providing lost motion, together with means operable independently of the valve mechanism for disconnecting the actuator from the source of suction and submerging the piston in atmosphere when the same is in retracted position.

4. In an automotive vehicle, the combination with an actuator operable upon differentials of fluid pressure and including a cylinder and a piston therein, controlling valve mechanism, means normally acting to hold said valve mechanism in position to submerge the piston in vacuum when in normal position, and means acting independently of the valve mechanism for submerging the piston in higher pressure when said piston is in normal position, together with means for operating the valve mechanism and causing the same to coact with said independently acting means to maintain the piston submerged in atmosphere when the valve mechanism is operated.

5. In an automotive vehicle, the combination with brake mechanism for the vehicle, a power actuator operating on differentials of fluid pressure, including a cylinder and a piston operating therein, and operatively connected with the brake mechanism, controlling valve mechanism, means acting to hold said valve mechanism in position to submerge the piston in low pressure when in its retracted or normal position, an auxiliary valve for disconnecting the actuator from low pressure and submerging the piston in high pressure when the controlling valve mechanism and piston are in normal position, and an operator operated part operatively connected to said valve mechanism and through lost motion to the brake mechanism, adapted when operated, in a direction to apply the brakes to cause a coaction of the controlling valve mechanism and auxiliary valve to maintain the piston submerged in higher pressure, whereby the operator operated part can be utilized to apply brakes independently of the actuator and prevent any differential of pressures in the actuator.

6. In an automotive vehicle, the combination with brake mechanism for the vehicle, a suction actuated power actuator therefor comprising a cylinder, a piston connected with said brake mechanism, and controlling valve mechanism, a suction pipe for connecting the power actuator with a source of suction, and an operator operated part connected with said valve mechanism and operatively connected with said brake mechanism by means providing lost motion, of manually operable means operated independently of the controlling valve mechanism and coacting therewith to maintain equalization of pressures on the piston during the operation of the operator operated part to render the power actuator inoperative and enable the brake mechanism to be applied by the physical force of the operator alone through the operator operated part.

7. In an automotive vehicle, the combination with brake mechanism for the vehicle, a suction actuated power actuator therefor comprising a cylinder closed at both ends, a piston therein connected with the brake mechanism, and controlling valve mechanism, a suction pipe for connecting said actuator cylinder forward of the piston, with a source of suction, and said valve mechanism being constructed to connect the portion of the cylinder in rear of the piston with the atmosphere and with the portion of the cylinder forward of the piston, an operator operated part connected with said valve mechanism and operatively connected with said piston by means providing lost motion sufficient to insure the operation of the valve mechanism, of an auxiliary valve mechanism located in the suction pipe and operated independently of the controlling valve mechanism and coacting therewith to maintain equalization of pressures on the piston during the operation of the operator operated part to render the power actuator inoperative and enable the brake mechanism to be applied by the physical force of the operator alone through the operator operated part.

In testimony whereof we affix our signatures.

CALEB S. BRAGG.
VICTOR W. KLIESRATH.